(12) United States Patent
Yan et al.

(10) Patent No.: US 12,374,979 B2
(45) Date of Patent: Jul. 29, 2025

(54) LINEAR VIBRATION MOTOR STRUCTURE WITH LONG SERVICE LIFE, AND IMPLEMENTATION METHOD THEREFOR

(71) Applicant: ZHEJIANG DONGYANG DONGCI CHENGJI ELECTRONICS CO., LTD., Zhejiang (CN)

(72) Inventors: Xinjiang Yan, Dongyang (CN); Yangdong Zhou, Dongyang (CN)

(73) Assignee: ZHEJIANG DONGYANG DONGCI CHENGJI ELECTRONICS CO., LTD., Zhejiang (CN)

( * ) Notice: Subject to any disclaimer, the term of this patent is extended or adjusted under 35 U.S.C. 154(b) by 322 days.

(21) Appl. No.: 18/003,319

(22) PCT Filed: Jun. 14, 2021

(86) PCT No.: PCT/CN2021/099921
§ 371 (c)(1),
(2) Date: Dec. 26, 2022

(87) PCT Pub. No.: WO2021/259087
PCT Pub. Date: Dec. 30, 2021

(65) Prior Publication Data
US 2023/0253867 A1 Aug. 10, 2023

(30) Foreign Application Priority Data
Jun. 24, 2020 (CN) .......................... 202010583979.5

(51) Int. Cl.
*H02K 33/18* (2006.01)
*H02K 3/26* (2006.01)
*G06F 3/01* (2006.01)

(52) U.S. Cl.
CPC ............... *H02K 33/18* (2013.01); *H02K 3/26* (2013.01); *G06F 3/016* (2013.01); *H02K 2203/03* (2013.01)

(58) Field of Classification Search
CPC ...... H02K 33/18; H02K 3/26; H02K 2203/03; H02K 33/16; H02K 33/02; G06F 3/016
See application file for complete search history.

(56) References Cited

U.S. PATENT DOCUMENTS

| | | | | |
|---|---|---|---|---|
| 2013/0278084 A1* | 10/2013 | Furuichi | ................ | H02K 33/16 310/25 |
| 2016/0226363 A1* | 8/2016 | Mao | ................... | H02K 33/16 |
| 2020/0044542 A1* | 2/2020 | Wang | ................... | H02K 33/18 |

FOREIGN PATENT DOCUMENTS

| | | |
|---|---|---|
| CN | 101049594 | 10/2007 |
| CN | 104617736 | 5/2015 |

(Continued)

*Primary Examiner* — Thomas Truong
(74) *Attorney, Agent, or Firm* — JMB Davis Ben-David (57) ABSTRACT

Disclosed are a linear vibration motor structure with a long service life, comprising a lower bracket, wherein a stator assembly is connected above the lower bracket; a vibrator assembly is sheathed outside the stator assembly; a casing is sheathed outside the vibrator assembly; the casing is connected above the lower bracket; the vibrator assembly is connected to the casing and the lower bracket by means of magnetic springs; and each magnetic spring comprises several first magnets and several third magnets. An implementation method for a linear vibration motor structure with a long service life is further disclosed. According to the present invention, the vibrator assembly is connected to the casing and the lower bracket by means of the magnetic springs, and the first magnets and the third magnets repel each other so as to form a magnetic spring with a spring-like effect, by means of which the use of a tangible spring in the motor can be avoided, such that a product will not fail due (Continued)

to the fatigue life and stress concentration of the tangible spring, thereby improving the reliability of the product and making the product have a long service life.

7 Claims, 5 Drawing Sheets

(56) References Cited

FOREIGN PATENT DOCUMENTS

| | | |
|---|---|---|
| CN | 104660106 | 5/2015 |
| CN | 107222080 | 9/2017 |
| CN | 207939387 | 10/2018 |
| CN | 208433891 U | 1/2019 |
| CN | 210629319 U | 5/2020 |
| CN | 111669023 | 9/2020 |
| JP | 2018160999 | 10/2018 |
| KR | 20150105788 | 9/2015 |
| KR | 20160000857 | 3/2016 |

* cited by examiner

LINEAR VIBRATION MOTOR STRUCTURE WITH LONG SERVICE LIFE, AND IMPLEMENTATION METHOD THEREFOR

CROSS-REFERENCE TO RELATED APPLICATIONS

This is the U.S. National Stage of International Patent Application No. PCT/CN2021/099921 filed on Jun. 14, 2021, which in turn claims the benefit of Chinese Patent Application No. 202010583979.5 filed on Jun. 24, 2020.

FIELD OF THE INVENTION

The present disclosure belongs to the technical field of linear vibration motors, and particularly to a linear vibration motor structure with a long service life, and an implementation method therefor.

BACKGROUND OF THE INVENTION

A miniature vibration motor is an indispensable component of an electronic product such as a mobile phone, a tablet computer, and an electronic toy, which provides a tactile feedback for a user. With the intensification of competition in the smartphone market, mobile phone manufacturers have paid more and more attention to tactile experiences of users. At present, a mobile consumer electronic product in the market generally uses a vibration motor as a system feedback component, such as incoming call notification of a mobile phone and vibration feedback of a game console. With the development of consumer electronics, a requirement of a mobile phone, a game console, etc., for the reliability life of a motor has increased. A conventional linear vibration motor uses a spring structure to provide a restoring force for vibration of a vibrator. Fatigue life and stress concentration are inevitable to the spring structure, resulting in spring fracture and motor failure. Therefore, it is necessary to design a linear vibration motor with a long service life.

SUMMARY OF THE INVENTION

An objective of the present disclosure is to provide a linear vibration motor structure with a long service life, so as to solve the problems presented in Background of the Invention. The linear vibration motor structure with a long service life provided in the present disclosure is characterized.

Another objective of the present disclosure is to provide an implementation method for a linear vibration motor structure with a long service life.

In order to achieve the above objectives, the present disclosure provides the following technical solution: a vibration motor structure with a long service life, including a lower bracket. A stator assembly is connected above the lower bracket. The stator assembly is sheathed with a vibrator assembly. The vibrator assembly is sheathed with a casing. The casing is connected above the lower bracket. The vibrator assembly is connected to the casing and the lower bracket by a magnetic spring. The magnetic spring includes a plurality of first steel magnets and a plurality of third steel magnets. The plurality of third steel magnets are arranged on two sides of the vibrator assembly. The plurality of first steel magnets are arranged at positions corresponding to the third steel magnets in the casing and the lower bracket.

Further, in the present disclosure, the stator assembly includes a coil and a Flexible Printed Circuit (FPC), where the FPC is arranged above the lower bracket, the coil is arranged above the FPC, and the coil is electrically connected with the FPC.

Further, in the present disclosure, the vibrator assembly includes a mass block, and a second steel magnet is arranged in the mass block.

Further, in the present disclosure, a magnetic frame is further arranged in the mass block, and the second steel magnet is fixed in the magnetic frame.

Further, in the present disclosure, a pole piece is connected to a bottom of the second steel magnet.

Further, in the present disclosure, three limiting grooves are circularly arrayed in a circumference of the mass block, and three limiting bumps corresponding to the limiting grooves are circularly arrayed on a circumference of the casing.

Further, in the present disclosure, totally six third steel magnets are arranged, where three third steel magnets are arranged on each side of the mass block, and three third steel magnets are circularly arrayed on a circumference of the mass block.

Further, in the present disclosure, totally six first steel magnets are arranged, where three first steel magnets are circularly arrayed in the casing, and three first steel magnets are circularly arrayed on the lower bracket.

Further, in the present disclosure, an implementation method for the linear vibration motor structure with a long service life includes the following steps:
(1) forming a closed accommodation cavity by a casing and a lower bracket to accommodate a vibrator assembly and stator assembly inside;
(2) fixing a second steel magnet in a magnetic frame to provide a magnetic field to drive a motor;
(3) forming a circuit by a coil and an FPC to generate an electric field by energizing to drive the motor to vibrate by interaction of the electric field and the magnetic field; and
(4) forming a magnetic spring by first steel magnets and third steel magnets to provide elasticity for motion of the motor such that the motor vibrates reciprocally.

Further, in the present disclosure, the stator assembly includes the coil and the FPC, where the FPC is arranged above the lower bracket, the coil is arranged above the FPC, and the coil is electrically connected with the FPC. The vibrator assembly includes a mass block, and a second steel magnet is arranged in the mass block. A magnetic frame is further arranged in the mass block, and the second steel magnet is fixed in the magnetic frame. A pole piece is connected to a bottom of the second steel magnet. Three limiting grooves are circularly arrayed in a circumference of the mass block, and three limiting bumps corresponding to the limiting grooves are circularly arrayed on a circumference of the casing. Totally six third steel magnets are arranged, where three third steel magnets are arranged on each side of the mass block, and three third steel magnets are circularly arrayed on the circumference of the mass block. Totally six first steel magnets are arranged, wherein three first steel magnets are circularly arrayed in the casing, and three first steel magnets are circularly arrayed on the lower bracket.

Compared with the prior art, the present disclosure has the following beneficial effects:

1: In the present disclosure, the vibrator assembly is connected to the casing and the lower bracket by the magnetic spring, and the first steel magnets and the third steel magnets repel each other to form the magnetic spring with a spring-like effect, so that use of a tangible spring in the motor can be avoided. Therefore, a product is prevented from failing due to the fatigue life and stress concentration of the tangible spring, improving the reliability of the product and achieving long service life of the product.

2: In the present disclosure, the magnetic frame is connected with the mass block by interference fit, and the second steel magnet is adhered in the magnetic frame by glue. The magnetic frame provides a mounting surface for the second steel magnet. In addition, the magnetic frame can increase the intensity of the magnetic field, thereby increasing a driving force for the motor.

3: In the present disclosure, the pole piece is a stainless steel component adhered to the bottom of the second steel magnet by glue, and can concentrate the magnetic field to increase a magnetic flux intensity of a coil side, thereby increasing the driving force.

4: In the present disclosure, the three limiting grooves are circularly arrayed in the circumference of the mass block, and the three limiting bumps corresponding to the limiting grooves are circularly arrayed on the circumference of the casing. The limiting bumps are embedded into the limiting grooves to limit the mass block, thereby preventing the mass block from rotating during vibration of the motor.

In the drawings: 1—casing; 101—limiting bump; 2—first steel magnet; 3—mass block; 31—limiting groove; 4—magnetic frame; 5—pole piece; 6—coil; 7—lower bracket; 8—FPC; 9—second steel magnet; and 10—third steel magnet.

DETAILED DESCRIPTION OF THE EMBODIMENTS

The technical solutions in embodiments of the present disclosure will be described clearly and completely below in combination with the drawings in the embodiments of the present disclosure. Clearly, the described embodiments are not all but only part of embodiments of the present disclosure. All other embodiments obtained by those of ordinary skill in the art based on the embodiments in the present disclosure without creative work shall fall within the scope of protection of the present disclosure.

Embodiment 1

Referring to FIGS. 1 to 6, the present disclosure provides the following solution: a linear vibration motor structure with a long service life, including a lower bracket 7. A stator assembly is connected above the lower bracket 7. The stator assembly is sheathed with a vibrator assembly. The vibrator assembly is sheathed with a casing 1. The casing 1 is connected above the lower bracket 7. The vibrator assembly is connected to the casing 1 and the lower bracket 7 by a magnetic spring. The magnetic spring includes a plurality of first steel magnets 2 and a plurality of third steel magnets 10. The plurality of third steel magnets 10 are arranged on two sides of the vibrator assembly. The plurality of first steel magnets 2 are arranged at positions corresponding to the third steel magnets 10 in the casing 1 and the lower bracket 7.

Figure 2:
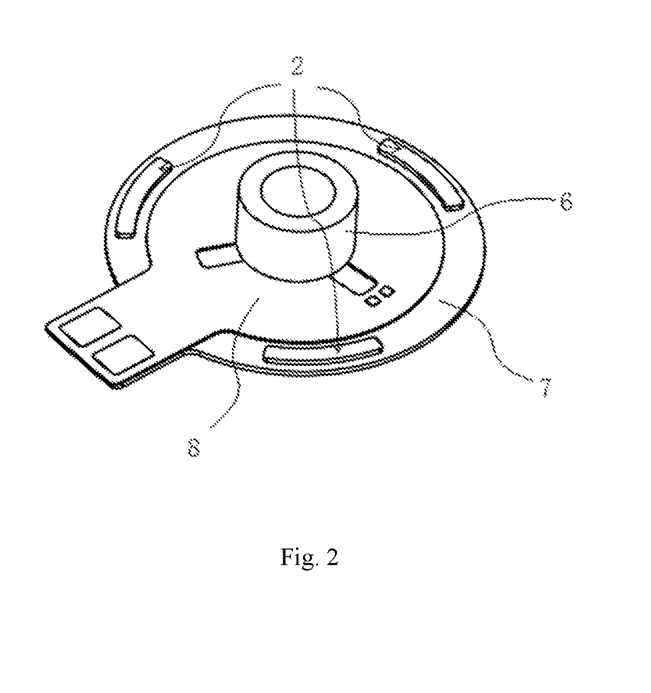
FIG. 2 is a schematic structural diagram of a stator assembly according to the present disclosure.

Further, the stator assembly includes a coil 6 and an FPC 8, where the FPC 8 is arranged above the lower bracket 7, the coil 6 is arranged above the FPC 8, and the coil 6 is electrically connected with the FPC 8.

With adoption of the above technical solution, the coil 6 and the FPC 8 form a circuit to generate an electric field by energizing to drive a motor to vibrate by interaction of the electric field and a magnetic field.

Figure 3:
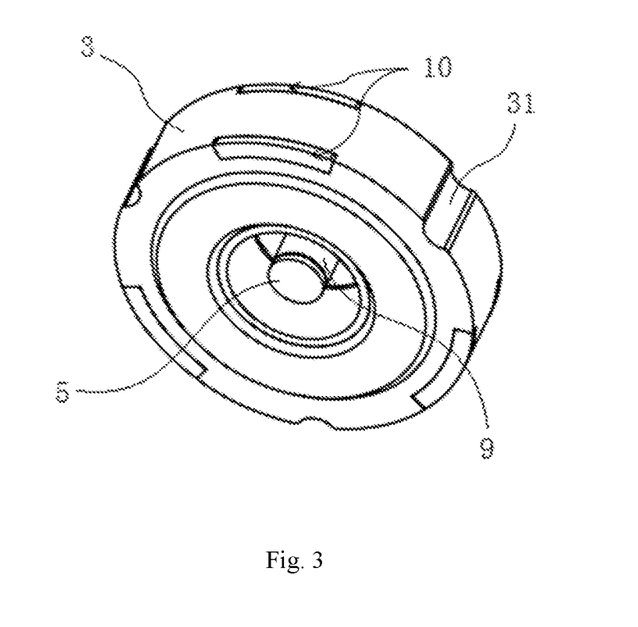
FIG. 3 is a schematic structural diagram of a vibrator assembly according to the present disclosure.

Further, the vibrator assembly includes a mass block 3, and a second steel magnet 9 is arranged in the mass block 3.

With adoption of the above technical solution, the second steel magnet 9 provides a magnetic field to drive the motor.

Figure 4:
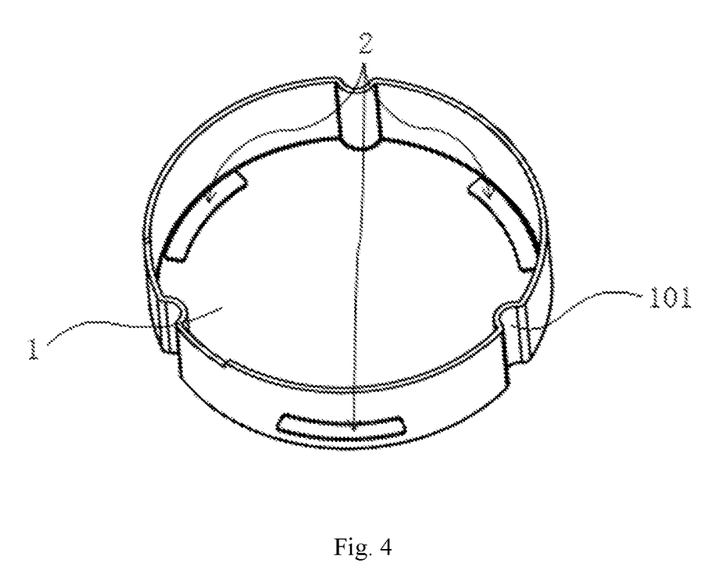
FIG. 4 is a schematic structural diagram of a casing according to the present disclosure.

Further, three limiting grooves 31 are circularly arrayed in a circumference of the mass block 3, and three limiting bumps 101 corresponding to the limiting grooves 31 are circularly arrayed on a circumference of the casing 1.

With adoption of the above technical solution, during mounting, the limiting bumps 101 are embedded into the limiting grooves 31 to limit the mass block 3, thereby preventing the mass block 3 from rotating during vibration of the motor.

Further, totally six third steel magnets 10 are arranged, where three third steel magnets 10 are arranged on each side of the mass block 3, and three third steel magnets 10 are circularly arrayed on a circumference of the mass block 3.

Figure 1:
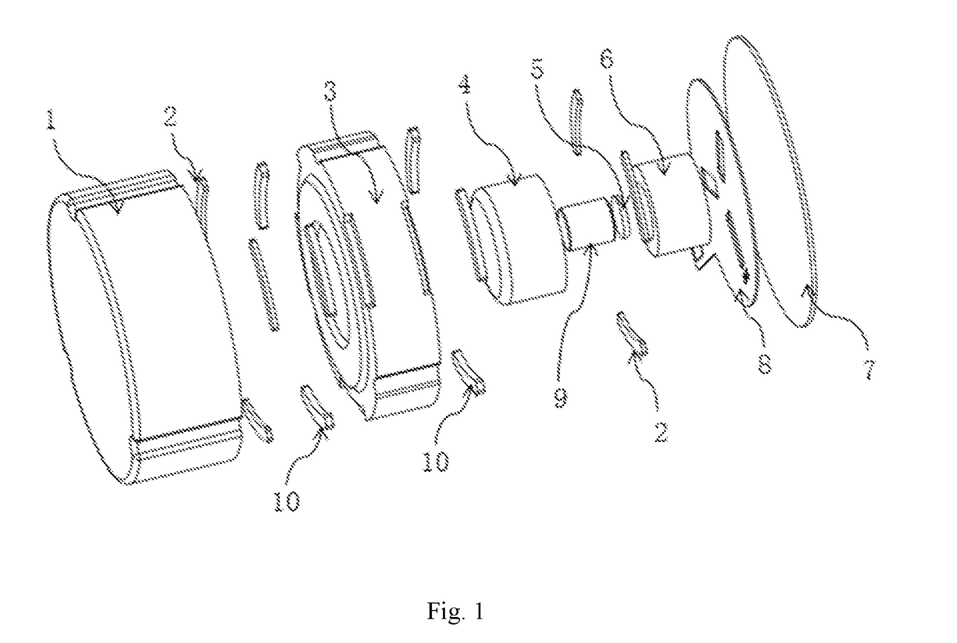
FIG. 1 is a schematic exploded structural diagram according to the present disclosure.

Further, totally six first steel magnets 2 are arranged, where three first steel magnets 2 are circularly arrayed in the casing 1, and three first steel magnets 2 are circularly arrayed on the lower bracket 7.

Figure 6:
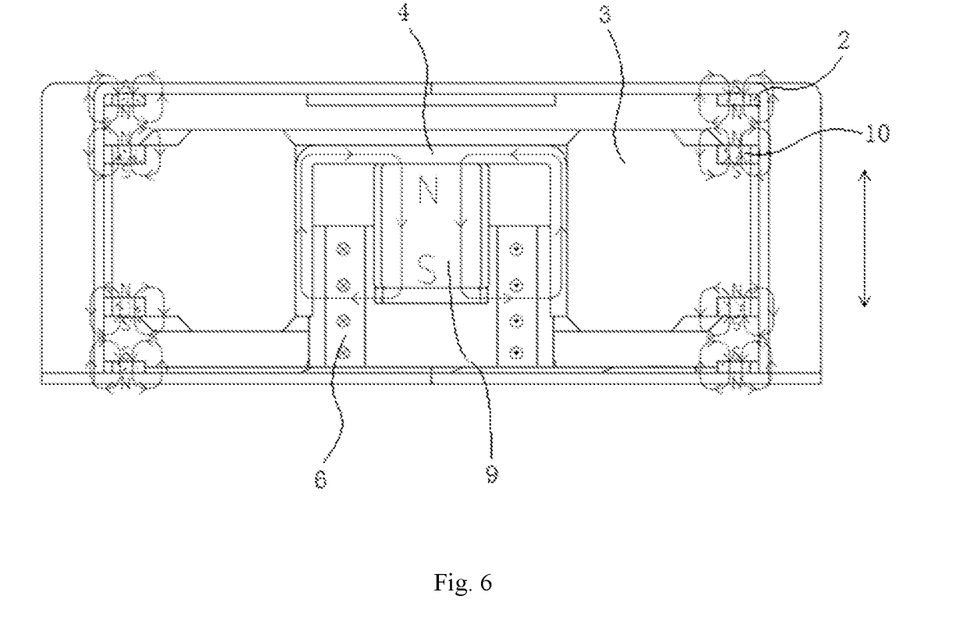
FIG. 6 is a schematic diagram of a magnetic force driving structure according to the present disclosure.

With adoption of the above technical solution, the first steel magnets 2 and the third steel magnets 10 repel each other to form the magnetic spring with a spring-like effect, so that use of a tangible spring in the motor can be avoided. Therefore, a product is prevented from failing due to the fatigue life and stress concentration of the tangible spring, improving the reliability of the product and achieving long service life of the product.

Embodiment 2

The present embodiment differs from embodiment 1 as follows: further, a magnetic frame 4 is further arranged in the mass block 3, and the second steel magnet 9 is fixed in the magnetic frame 4.

With adoption of the above technical solution, the magnetic frame 4 is connected with the mass block 3 by interference fit, and the second steel magnet 9 is adhered in the magnetic frame 4 by glue. The magnetic frame 4 provides a mounting surface for the second steel magnet 9. In addition, the magnetic frame 4 can increase the intensity of the magnetic field, thereby increasing a driving force for the motor.

Embodiment 3

The present embodiment differs from embodiment 1 as follows: further, a pole piece 5 is connected to a bottom of the second steel magnet 9.

With adoption of the above technical solution, the pole piece 5 is a stainless steel magnetic conduction component, and can concentrate the magnetic field to increase a magnetic flux intensity of a coil side, thereby increasing the driving force.

Further, an implementation method for the linear vibration motor structure with a long service life in the present disclosure includes the following steps.

Figure 5:
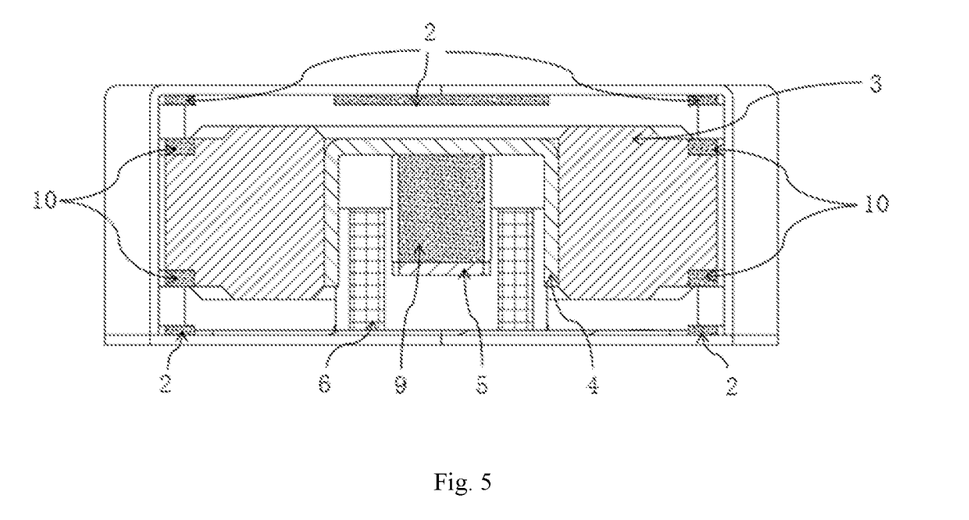
FIG. 5 is a schematic sectional structural diagram according to the present disclosure.

(1) A closed accommodation cavity is formed by a casing 1 and a lower bracket 7 to accommodate a vibrator assembly and stator assembly inside.

(2) A second steel magnet 9 is fixed in a magnetic frame 4 to provide a magnetic field to drive a motor.

(3) A circuit is formed by a coil 6 and an FPC 8 to generate an electric field by energizing to drive the motor to vibrate by interaction of the electric field and the magnetic field.

(4) A magnetic spring is formed by first steel magnets 2 and third steel magnets 10 to provide elasticity for motion of the motor such that the motor vibrates reciprocally.

In summary, in the present disclosure, the vibrator assembly is connected to the casing 1 and the lower bracket 7 by the magnetic spring, and the first steel magnets 2 and the third steel magnets 10 repel each other to form the magnetic spring with a spring-like effect, so that use of a tangible spring in the motor can be avoided. Therefore, a product is prevented from failing due to the fatigue life and stress concentration of the tangible spring, improving the reliability of the product and achieving long service life of the product. In the present disclosure, the magnetic frame 4 is connected with the mass block 3 by interference fit, and the second steel magnet 9 is adhered in the magnetic frame 4 by glue. The magnetic frame 4 provides a mounting surface for the second steel magnet 9. In addition, the magnetic frame 4 can increase the intensity of the magnetic field, thereby increasing a driving force for the motor. In the present disclosure, the pole piece 5 is a stainless steel magnetic conduction component adhered to the bottom of the second steel magnet 9 by glue, and can concentrate the magnetic field to increase a magnetic flux intensity of a coil side, thereby increasing the driving force. In the present disclosure, the three limiting grooves 31 are circularly arrayed in the circumference of the mass block 3, and the three limiting bumps 101 corresponding to the limiting grooves 31 are circularly arrayed on the circumference of the casing 1. The limiting bumps 101 are embedded into the limiting grooves 31 to limit the mass block 3, thereby preventing the mass block 3 from rotating during vibration of the motor.

Although the embodiments of the present disclosure have been shown and described, it can be understood by those of ordinary skill in the art that various variations, modifications, replacements, and transformations may be made to these embodiments without departing from the principle and spirit of the present disclosure. The scope of the present disclosure is defined by the appended claims and equivalents thereof.

The invention claimed is:

1. A linear vibration motor structure with a long service life, comprising a lower bracket (7), wherein a stator assembly is connected above the lower bracket (7); the stator assembly is sheathed with a vibrator assembly; the vibrator assembly is sheathed with a casing (1); the casing (1) is connected above the lower bracket (7); the vibrator assembly is connected to the casing (1) and the lower bracket (7) by a magnetic spring; the magnetic spring comprises a plurality of first steel magnets (2) and a plurality of third steel magnets (10); the plurality of third steel magnets (10) are arranged on two sides of the vibrator assembly; and the plurality of first steel magnets (2) are arranged at positions corresponding to the third steel magnets (10) in the casing (1) and the lower bracket (7);

a mass block (3), and a second steel magnet (9) is arranged in the mass block (3)

wherein totally six third steel magnets (10) are arranged, wherein three third steel magnets (10) are arranged on each side of the mass block (3), and three third steel magnets (10) are circularly arrayed on a circumference of the mass block (3).

2. The linear vibration motor structure with a long service life according to claim 1, wherein the stator assembly comprises a coil (6) and a Flexible Printed Circuit (FPC) (8), wherein the FPC (8) is arranged above the lower bracket (7), the coil (6) is arranged above the FPC (8), and the coil (6) is electrically connected with the FPC (8).

3. The linear vibration motor structure with a long service life according to claim 1, wherein a magnetic frame (4) is further arranged in the mass block (3), and the second steel magnet (9) is fixed in the magnetic frame (4).

4. The linear vibration motor structure with a long service life according to claim 1, wherein a pole piece (5) is connected to a bottom of the second steel magnet (9).

5. The linear vibration motor structure with a long service life according to claim 1, wherein three limiting grooves (3) are circularly arrayed in the circumference of the mass block (3), and three limiting bumps (101) corresponding to the limiting grooves (3) are circularly arrayed on a circumference of the casing (1).

6. The linear vibration motor structure with a long service life according to claim 1, wherein totally six first steel magnets (2) are arranged, wherein three first steel magnets (2) are circularly arrayed in the casing (1), and three first steel magnets (2) are circularly arrayed on the lower bracket (7).

7. An implementation method for the linear vibration motor structure with a long service life the method comprising the following steps:

(1) forming a closed accommodation cavity by a casing (1) and a lower bracket (7) to accommodate a vibrator assembly and stator assembly inside;

(2) fixing a second steel magnet (9) in a magnetic frame (4) to provide a magnetic field to drive a motor;

(3) forming a circuit by a coil (6) and an FPC (8) to generate an electric field by energizing to drive the motor to vibrate by interaction of the electric field and the magnetic field; and (4) forming a magnetic spring by first steel magnets (2) and third steel magnets (10) to provide elasticity for motion of the motor such that the motor vibrates reciprocally;

wherein the stator assembly comprises the coil (6) and the FPC (8), wherein the FPC (8) is arranged above the lower bracket (7), the coil (6) is arranged above the FPC (8), and the coil (6) is electrically connected with the FPC (8): the vibrator assembly comprises a mass block (3), and a second steel magnet (9) is arranged in the mass block (3); a magnetic frame (4) is further arranged in the mass block (3), and the second steel magnet (9) is fixed in the magnetic frame (4); a pole piece (5) is connected to a bottom of the second steel magnet (9); three limiting grooves (31) are circularly arrayed in a circumference of the mass block (3), and three limiting bumps (101) corresponding to the limiting grooves (31) are circularly arrayed on a circumference of the casing (1); a total of six third steel magnets (10) are arranged, wherein three third steel magnets (10) of the six steel magnets (10) are arranged on each side of the mass block (3), and the three third steel magnets (10) are circularly arrayed on the circumference of the mass block (3); and a total of six first steel magnets (2) are arranged, wherein three first steel magnets (2) of the six first steel magnet are circularly arrayed in the casing (1), and another three first steel magnets (2) are circularly arrayed on the lower bracket (7).

\* \* \* \* \*